(12) United States Patent
Angelov et al.

(10) Patent No.: US 10,176,307 B2
(45) Date of Patent: Jan. 8, 2019

(54) LICENSING USING A NODE LOCKED VIRTUAL MACHINE

(71) Applicant: INFOCUS CORPORATION, Portland, OR (US)

(72) Inventors: Stanislav Angelov, Pleasanton, CA (US); Robert Gardyne, Oakland, CA (US)

(73) Assignee: INFOCUS CORPORATION, Portland, OR (US)

( * ) Notice: Subject to any disclaimer, the term of this patent is extended or adjusted under 35 U.S.C. 154(b) by 0 days.

(21) Appl. No.: 14/941,015

(22) Filed: Nov. 13, 2015

(65) Prior Publication Data

US 2016/0070891 A1 Mar. 10, 2016

Related U.S. Application Data

(63) Continuation of application No. 13/831,651, filed on Mar. 15, 2013, now abandoned.

(51) Int. Cl.
*G06F 21/00* (2013.01)
*G06F 21/10* (2013.01)
*G06F 9/455* (2018.01)

(52) U.S. Cl.
CPC ........ *G06F 21/105* (2013.01); *G06F 9/45558* (2013.01); *G06F 21/10* (2013.01); *G06F 2009/4557* (2013.01); *G06F 2221/0773* (2013.01)

(58) Field of Classification Search
CPC .......... G06F 21/10; G06F 21/12; G06F 21/14; G06F 21/33; G06F 21/53; G06F 21/105; G06F 9/45533; G06F 9/45558; H04L 63/10; H04L 63/102
See application file for complete search history.

(56) References Cited

U.S. PATENT DOCUMENTS

| | | | |
|---|---|---|---|
| 2010/0205303 A1* | 8/2010 | Chaturvedi | G06F 21/126 709/226 |
| 2011/0197062 A1* | 8/2011 | De Gaetano | H04L 63/10 713/167 |
| 2014/0006804 A1* | 1/2014 | Tkacik | G06F 21/53 713/192 |
| 2014/0181892 A1* | 6/2014 | Von Bokern | H04L 63/102 726/1 |

* cited by examiner

*Primary Examiner* — Noura Zoubair
(74) *Attorney, Agent, or Firm* — McCoy Russell LLP

(57) ABSTRACT

A method of licensing software to a particular instance of a virtual machine that is being run as part of an Active Directory domain. Since a virtual machine is a simulation of a physical machine, i.e. a computer, it can easily be cloned to produce an exact duplicate. This poses a problem when it is desired to license an instance of software for use only on a particular virtual machine. The technology disclosed allows for software to be licensed for execution only on a particular instance of a virtual machine that is being run as part of an Active Directory domain.

12 Claims, 4 Drawing Sheets

LICENSING USING A NODE LOCKED VIRTUAL MACHINE

BACKGROUND

The technology disclosed relates to licensing software executing on virtual machines. Since a virtual machine is a simulation of a physical machine, i.e. a computer, it can easily be cloned to produce an exact duplicate. This poses a problem when it is desired to license an instance of software for use only on a particular virtual machine.

Historically one of the primary software licensing methods has been to license software, such as an instance of a software application, such that it is only permitted to execute on a particular physical computer or "node" in a computer network. Another name for a node is a "machine." In this sense the software license "locks" the software to the particular physical computer and hence the term "node-locked" license.

This type of license makes use of unique characteristics of a node, such as the physical computing hardware, to identify a node, and lock the desired software license to it. This is typically done by executing licensing software on the node being licensed that retrieves a unique identifying characteristic of the machine such as the MAC address of a network card or the serial number of the main hard drive and sending this information to a remote license server which grants a license, in the form of license data, to the node. The licensing software then stores the license data in a location accessible to the node, such as a local disk drive or a network drive. The licensing software may or may not be part of the software being licensed. If it is not part of the software being licensed it is typically a software module that is called by the software being licensed.

Upon execution, the software being licensed then invokes the licensing software which obtains the unique identifying characteristic of the node and compares it to unique identifying characteristic in the stored license data. If they match, the software being licensed continues execution normally. Otherwise it terminates execution and usually notifies the user that the license was not valid.

However, the absence of a unique physical characteristic for a virtual machine renders the above methods unusable for licensing software operating on a virtual machine, since a virtual machine, even though it may be a complete simulation of a physical machine (computer), may easily be cloned to produce an exact copy with exactly the same characteristics as the original from which it was cloned.

Thus, with the large number of virtual machines now in use, it is therefore desirable to devise a method that would provide a unique identifier for a virtual machine such as a digitally readable identification code that can be used for licensing purposes.

SUMMARY

The technology disclosed provides a method of licensing software to a particular instance of a Microsoft Windows® operating system executing on a virtual machine, abbreviated VM, which belongs to a Microsoft Windows® Active Directory domain. There is a distinction here to be made between a VM and an operating system, abbreviated OS, running on the VM. Since a virtual machine is a simulation of a physical machine, i.e. a computer, it can easily be cloned to produce an exact duplicate. Furthermore, multiple operating systems can be run on both a physical machine and a VM simultaneously. This poses a problem when it is desired to license an instance of software for use only with a particular instance of an OS running on a VM. The technology disclosed provides a solution is intended to be used with installations of Microsoft Windows® OSs and applies to Active Directory domains implemented using Microsoft products as well as those implemented to conform to Microsoft's design.

In brief, Microsoft Windows® provides Active Directory domain services which are run on Windows servers, and as additional machines running Microsoft Windows® OS, virtual or physical, join a domain, each is assigned a unique machine ID by Active Directory Domain Services. The machine ID is also known as a Relative ID in a Windows® SID, where the SID is a Security Identifier. Even if an exact copy of a VM on the domain is made by a process commonly called "cloning," when that cloned VM runs Microsoft Windows® OS and joins the domain it is immediately assigned its own unique machine ID different from all other machine IDs on the domain.

The technology disclosed makes use of the fact that within an enterprise running Active Directory Domain Services, there may be multiple domains, each one having a unique domain ID. Thus, within a collection of domains running under Active Directory domain services the combination of the machine ID and its domain ID may be used to uniquely identify a particular machine.

The technology disclosed combines a machine ID and its domain ID and transforms it into a unique identifier using a hash function. This unique identifier corresponds directly to the machine ID and the domain ID, and thus it may be used to overcome the limitations of node-locked licensing previously posed by virtual machines. This identifier uniquely identifies a particular instance of Windows® OS. Consequently, this identifier may be used to license software running on a Microsoft Windows® OS running in a VM on an Active Directory in the same way as a unique identifier derived from unique characteristics of a physical machine.

The unique identifier itself is a hash. A hash, usually performed by a hash function, is the result of performing a transformation that maps a data set of variable or fixed length to a smaller data set of fixed length. Some common hash lengths used for cryptographic purposes are 128 and 256 bits. The most important property of a hash function is collision resistance, i.e., the probability is very low that any two different inputs will produce an identical output value. There are a wide variety of hash implementations which will be apparent to those of ordinary skill in the art.

Other aspects and advantages of the technology disclosed can be seen on review of the drawings, the detailed description and the claims, which follow.

DETAILED DESCRIPTION

Figure 1:
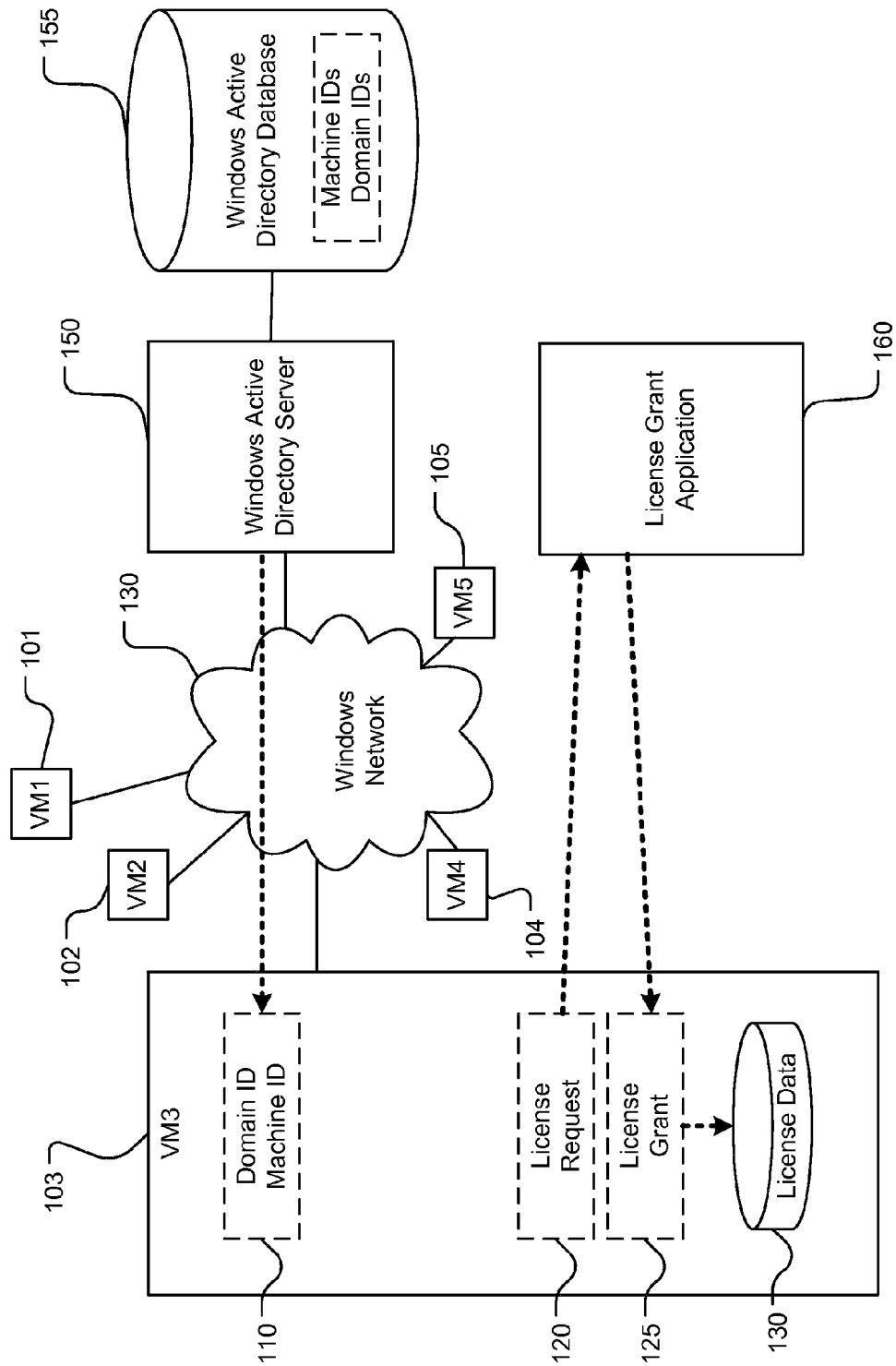
FIG. 1 is a block diagram of the environment in which the technology disclosed may be used.
Figure 2:
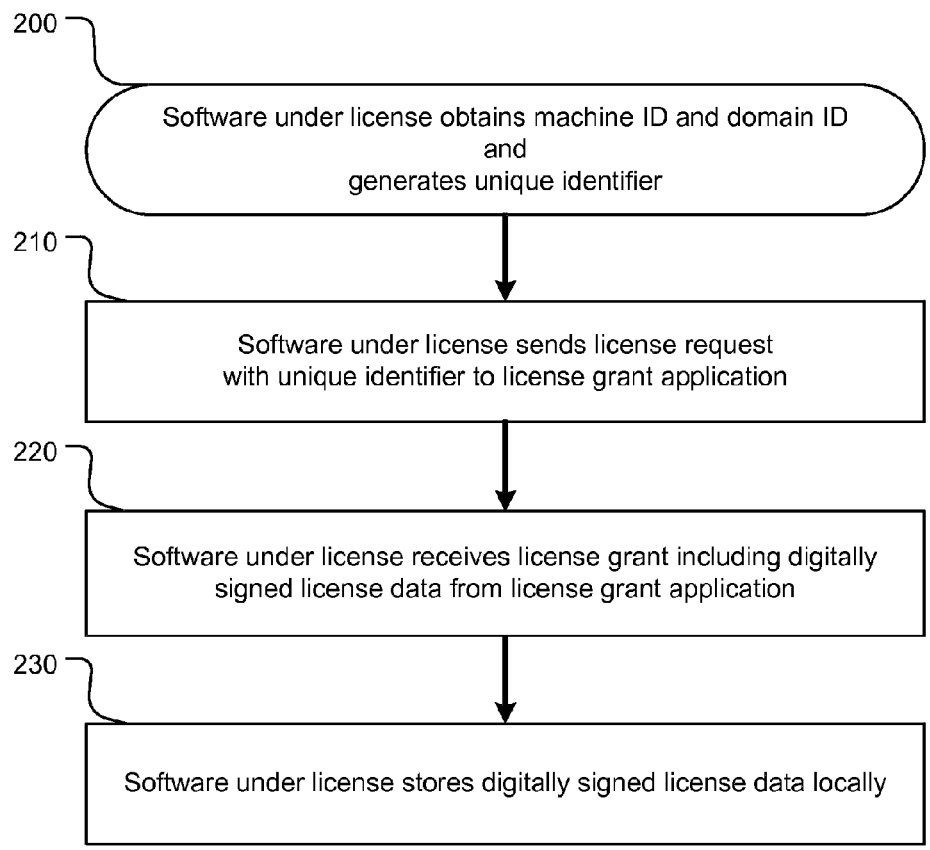
FIG. 2 is a flowchart of the licensing process from the perspective of the software under license.
Figure 3:
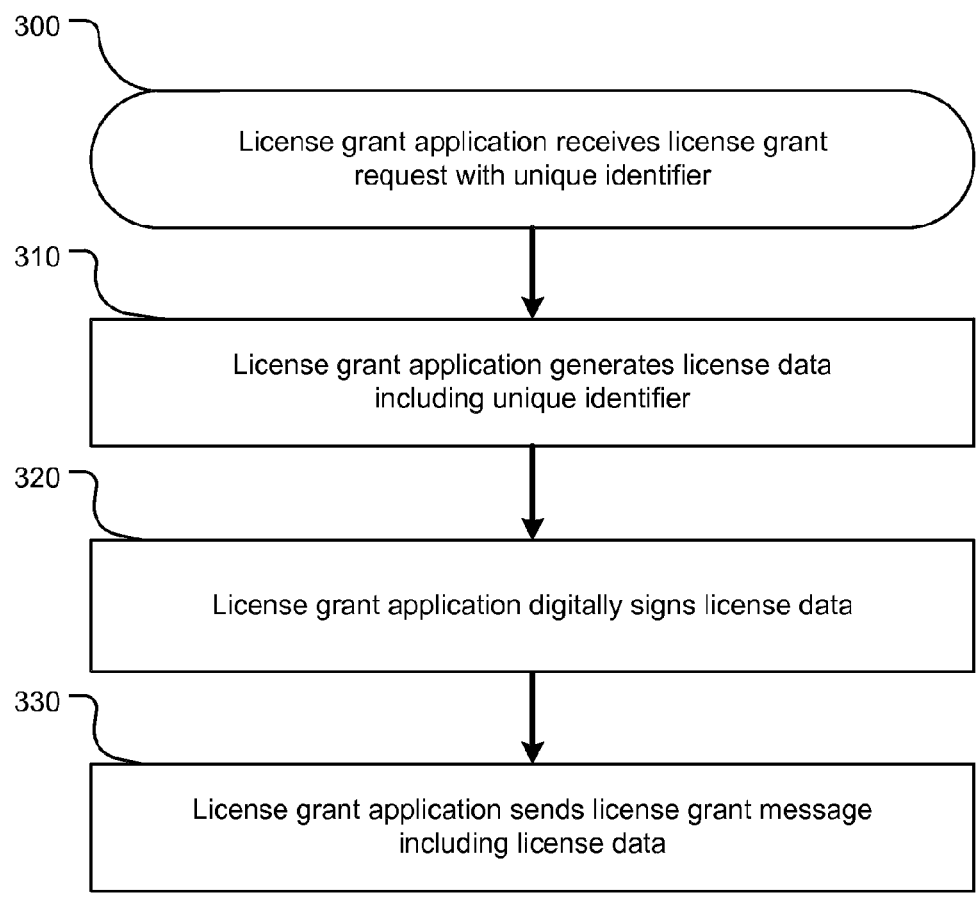
FIG. 3 is a flowchart of the licensing process from the perspective of the license grant application.

A detailed description of implementations of the technology disclosed is provided with reference to the FIGS. 1-3.

FIG. 1 is a block diagram of the environment in which the technology disclosed may be used. The main components include installations of Microsoft Windows® OSs running on virtual machines (VMs) which belong to a domain managed by Microsoft Windows® Active Directory services ("Active Directory Services" or "Active Directory") and a license grant application accessible by the software under license. Five VMs are shown, numbered 101-105, with VM3 103 being the one that will be used in the example describing FIG. 1. There are three basic parts to the license process:

1. The machine ID and domain ID are assigned by Active Directory.
2. The software under license obtains a license
3. The software under license verifies the license The first part of the process occurs automatically when a machine ID and a domain ID are assigned by Active Directory when an installation of Microsoft Windows® OS is first run on a VM, such as VM3 in this example, and joins an Active Directory domain.

This is indicated in FIG. 1 by the dotted arrow running from the server 150 to the domain ID and machine ID 110 within VM3 103. The combination of the domain ID and the machine ID uniquely identify an instance of Microsoft Windows® OS running on a VM that belongs to a domain being managed by Active Directory services.

The second part of the process starts by obtaining a unique identifier based on the machine ID and the domain ID. This is accomplished when the software under license generates a hash using a combination of the machine ID and the domain ID as input. The resulting hash is used as a unique identifier which corresponds to the machine ID and its domain ID. This identifier is then incorporated into a license request 120 and sent to the license grant application 160, which incorporates it into license data, digitally signs the license data and sends it back to the software under license. In some implementations this may be in the form of a license certificate. In others it may be in the form of a license grant response. Both approaches work since they both include the unique identifier used to verify a license. The digitally signed license data 130 is then stored in a location accessible to the software under license. The process of digitally signing data is performed using a digital signature algorithm such as DSA which is a United States Federal Government standard originally proposed by the National Institute of Standards and Technology. Another government standard is the Elliptic Curve Digital Signature Algorithm, or ECDSA. In addition there are other digital signature algorithms such as those based on an RSA public-private key exchange with accompanying encryption.

The third part of the license process is verification of the license. When the software under license is executed, it retrieves the license data 130 from the location in which it was previously stored, verifies the digital signature and obtains the original unique identifier. This is compared to a new unique identifier obtained by feeding the current machine ID and domain ID into the same hash function as used previously. If the exact same machine ID and domain ID as before are used, then the results of the hash function will be exactly as before and the newly generated unique identifier will match the original one that was digitally signed and stored with the license data, thus successfully verifying the license.

If the verification is successful, the software under license continues execution. Otherwise it terminates, usually with a message that notifies the user that the verification failed.

FIG. 2 is a flowchart of the licensing process from the perspective of the software under license. The explanation is similar to that of FIG. 1. It begins with step 200 when the software under license obtains the machine ID and the domain ID, combines them and generates a unique identifier using a hash function.

In Step 210 the unique identifier is incorporated into a license request and sent to a license grant application.

In step 220 the software under license receives digitally signed license data back from the license grant application. The digitally signed license data includes the unique identifier. The license data may be in the form of a license grant response or a license certificate. There are several alternatives that will be known to those of ordinary skill in the art.

In Step 230 the license data is stored in a location accessible to the software under license.

FIG. 3 is a flowchart of the licensing process from the perspective of the license grant application. The explanation is similar to that of FIG. 1. It begins with step 300 when the license grant application receives a license request which includes a unique identifier.

In step 310 the license grant application now generates license data incorporating the unique identifier.

In step 320 the license grant application digitally signs the license data. In step 330 the license grant application incorporates the digitally signed license data into a license grant response and sends it back to the requestor.

Figure 4:
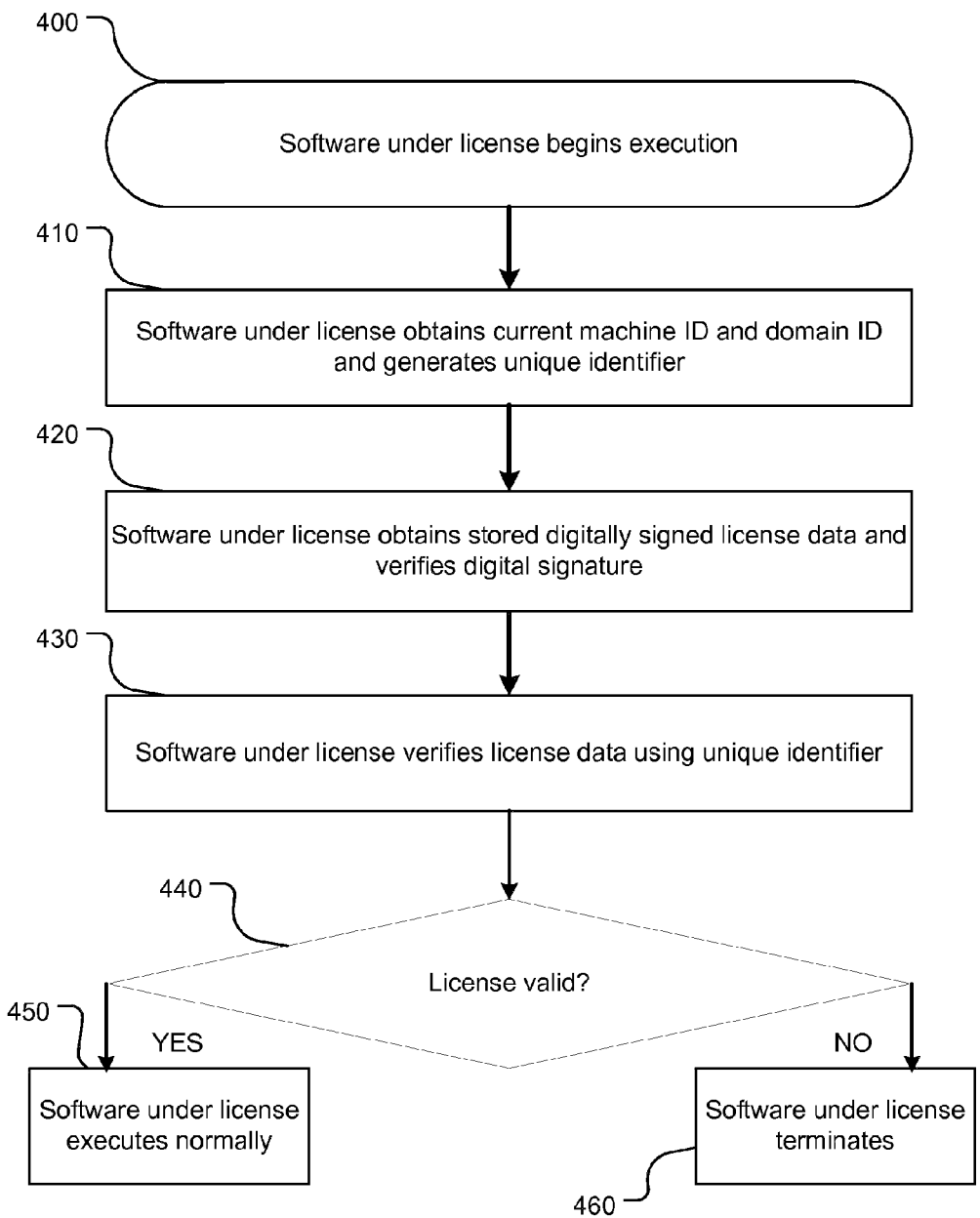
FIG. 4 is a flowchart of license verification process from the perspective of the software under license.

FIG. 4 is a flowchart of the license verification process from the perspective of the software under license. The explanation is similar to that of FIG. 1. It begins with step 400 and in step 410 the software under license obtains the current machine ID and the current domain ID, combines them and generates a current unique identifier using a hash function.

In step 420 the software under license retrieves the license data FIG. 1 130 from the location in which it was previously stored in step FIG. 2 230, verifies the digital signature and obtains the original unique identifier. This is compared to the current unique identifier obtained above in step 410. If they match in step 440, then verification is successful and the software executes normally as in step 450. If they do not match then the license, based on the license data retrieved above in step 420, is not valid and in this and most alternate implementations the software under license terminates as in step 460.

Particular Implementations

The technology disclosed may be practiced as a method or system adapted to practice the method. The process of digitally signing data is performed using a digital signature algorithm such as DSA which is a United States Federal Government standard originally proposed by the National Institute of Standards and Technology. Another government standard is the Elliptic Curve Digital Signature Algorithm, or ECDSA. In addition there are other digital signature algorithms such as those based on an RSA public-private key exchange with accompanying encryption.

In one implementation, a method is described for managing a software license for software under license running on a Microsoft Windows® OS running on virtual machines (VMs) which belong to a domain managed by Microsoft Windows® Active Directory services. Active Directory is a Microsoft Windows® directory service for Windows domain networks. A domain controller, such as Microsoft's Active Directory domain services, manages the machines on a domain. A machine ID and a domain ID are assigned by Active Directory when an installation of Microsoft Windows® OS is first run on a VM and joins an Active Directory domain. The combination of the domain ID and the machine ID uniquely identify an instance of Microsoft Windows®

OS running on a VM that belongs to a domain being managed by Active Directory services. A unique identifier can be generated using the domain ID and machine ID, and this identifier can be used to license software running on the OS installation. This unique identifier may be incorporated into license data, which may be in the form of a license certificate, that binds the software under license to a particular instance of Microsoft Windows® OS running on virtual machines (VMs) which belong to a domain managed by Microsoft Windows® Active Directory services.

This method and other implementations the technology disclosed each optionally include one or more the following features.

The software under license can generate a hash using a combination of the machine ID and the domain ID as input. The resulting hash is used as a unique identifier which corresponds to the machine ID and its domain ID. This identifier is then incorporated into a license request and sent to license grant application, which incorporates it into license data, digitally signs the license data and sends it back to the software under license. The digitally signed license data is then stored in a location accessible to the software under license.

A unique ID can, alternatively, be constructed by using the machine ID and the domain ID directly as the unique identifier instead of a hash.

Other implementations may include a non-transitory computer readable storage media storing instructions executable on a processor to perform a method is described above. Yet another implementation may include a system with memory and one or more processors operable to execute instructions, stored in memory, perform the method as described above. This is true of each of the following implementations and will, for the sake of brevity, not be repeated.

In another implementation, when the software under license is executed, it retrieves the license data from the location in which it was previously stored, verifies the digital signature and obtains the registered unique identifier. This is compared to a current unique identifier obtained by feeding the current machine ID and domain ID into the same hash function as used previously. If the exact same machine ID and domain ID as before are used, then the results of the hash function will be exactly as before and the newly generated unique identifier will match the original one that was digitally signed and stored with the license data, thus successfully verifying the license. If the verification is successful, the software under license continues execution. Otherwise it terminates, usually with a message that notifies the user that the verification failed.

This implementation can be combined with any of the registration features described above.

In another implementation, either of the two previous methods could be used with a central license server in place of the license grant application. The license server could Ernie store all the license data in a database and verify incoming license requests against the license data stored in the database.

In another implementation the software under license executing on an instance of a Microsoft Windows® operating system executing on a VM belonging to an Active Directory domain verifies that it is licensed to run on a particular instance of Microsoft Windows® operating system executing on a VM belonging to an Active Directory domain by comparing a current unique value to a digitally signed registered unique value stored in a location accessible to the software under license, such as a local disk drive or a network drive.

To register, the software first obtains the values of the machine ID and the domain ID corresponding to the particular instance of Microsoft Windows® operating system executing on a VM belonging to an Active Directory domain. The unique value may be a combination of the machine ID and the domain ID or it may be a value derived the machine ID and the domain ID, such as the result of performing a hash on a combination of the machine ID and the domain ID. In either case, a unique value corresponding to the current machine ID and the current domain ID is obtained and sent to a license grant application digitally signs it and sends it back as license data which may be in the form of a license grant response or license certificate. When the software under license receives the digitally signed license data, it stores it in a location accessible to the software under license, such as a local disk drive or a network drive. This completes the registration process.

To perform the license verification, the software under license first obtains the current values of the machine ID and the domain ID corresponding to the particular instance of Microsoft Windows® operating system executing on a VM belonging to an Active Directory domain. As noted above, the unique value may be a combination of the machine ID and the domain ID or it may be a value derived the machine ID and the domain ID, such as the result of performing a hash on a combination of the machine ID and the domain ID. In either case, a current unique value corresponding to the current machine ID and the current domain ID is obtained. The emphasis here is on the current values of the machine ID and domain ID as opposed to the values used at a prior time for registration, since the goal is to ensure that they have not changed in the interim and that they match, the process being described below.

The software now retrieves the digitally signed registered unique value, which may be stored on non-transitory computer readable storage media accessible to the software and verifies the digital signature using any one of several methods, including the digital signature algorithms mentioned elsewhere in this document.

The final step in the process is to compare the registered unique value to the current unique value, both having been generated in the same manner. In particular, if the same hash function is used to generate both the current and registered unique values, then the result will be exactly equal if they are both generated using the same input values. Alternatively, the combination of a machine ID and domain ID can be used in which case the registered combination of the machine ID and domain ID should match the current combination of the machine ID and domain ID. As explained elsewhere, this latter method is not as efficient or as secure as using a hash.

Once the current and registered values of the unique ID have been verified to match, the verification process is complete and the software under license may continue execution. If they do not match, then an appropriate message may be sent to the user and the software under license may not continue execution.

While the technology disclosed is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. A method of managing a license certificate for software executing on an instance of an operating system executing on a virtual machine (VM) belonging to an Active Directory domain, including:
   obtaining a machine ID for the instance of the operating system executing on the VM and belonging to the Active Directory domain;
   obtaining a domain ID for said Active Directory domain, where the machine ID and the domain ID are automatically assigned via a server of the Active Directory domain responsive to the instance of the operating system being run on the VM, wherein the server of the Active Directory domain is a remote server communicatively connected with the VM;
   sending to a remotely coupled license grant application a license request that includes an original unique value derived from the machine ID and the domain ID, where the license request is associated with the software, where the original unique value is an identifier for the instance of the operating system running on the VM that differentiates cloned machines, and where the machine ID is not tied to hardware on which the VM is hosted;
   receiving from the remotely coupled license grant application digitally signed license data that includes the original unique value derived from the machine ID and the domain ID;
   storing the digitally signed license data in a network drive accessible by the software that includes the original unique value in a location accessible to the software; and then
   when the software is executed on the instance of the operating system executing on the VM belonging to the Active Directory domain thereafter, newly generating a new unique value derived from the machine ID and the domain ID and verifying the license certificate, where verifying the license certificate includes comparing the stored digitally signed license data that includes the original unique value to the new unique value;
   responsive to successfully verifying that the original unique value of the stored digitally signed license data matches the new unique value, continue executing the software; and
   responsive to failing to verify that the original unique value of the stored digitally signed license data matches the new unique value, providing a message to notify a user that verification of the license certificate failed and terminating execution of the software.

2. The method of claim 1, in which a function for deriving the original unique value combines the machine ID and the domain ID.

3. The method of claim 1, in which a function for deriving the original unique value is a hash of the machine ID and the domain ID.

4. A system, comprising:
   an Active Directory server;
   a virtual machine (VM) connected to the Active Directory server via a network, the VM belonging to an Active Directory domain that is managed by the Active Directory server, where an instance of an operating system (OS) is executing on the VM, and where software is executing on the instance of the OS; and
   a central license server that is remote to the VM, where the VM is hosted on hardware that includes a processor and a computer readable storage medium storing computer instructions in non-transitory memory configured to cause the processor to:
      obtain a machine ID from the Active Directory server for the instance of the OS executing on the VM and belonging to the Active Directory domain, where the machine ID is automatically assigned via the Active Directory server responsive to the instance of the OS being run on the VM, and where the machine ID is not tied to hardware on which the VM is hosted, wherein the Active Directory server is a remote server communicatively connected with the VM;
      obtain a domain ID for said Active Directory domain that is automatically assigned via the Active Directory server;
      send to the central license server a license request that includes an original unique value derived from the machine ID and the domain ID, where the license request is associated with the software, where the original unique value is an identifier for the instance of the OS executing on the VM;
      receive from the central license server digitally signed license data that includes the original unique value derived from the machine ID and the domain ID; and then
      when the software is executed on the instance of the operating system executed on the VM thereafter, newly generate a new unique value from the machine ID and the domain ID,
      send the new unique value to the central license server;
      continue to execute the software responsive to receiving confirmation from the central license server verifying that the original unique value included in the stored digitally signed license data matches the newly generated new unique value derived from the machine ID and the domain ID; and
   responsive to failing to verify that the original unique value of the stored digitally signed license data matches the new unique value, providing a message to notify a user that verification of a license certificate of the software failed and terminating execution of the software.

5. The system of claim 4, in which the new unique value is generated by combining the machine ID and the domain ID.

6. The system of claim 4, in which the new unique value is generated via a hash of the machine ID and the domain ID.

7. A computer readable storage medium storing non-transitory computer instructions configured to cause a processor to:
   responsive to executing software on an instance of an operating system (OS), the OS executing on a virtual machine (VM) and belonging to a domain managed by an Active Directory server, obtain a machine ID from the Active Directory server for the instance of the OS executing on the VM and belonging to the domain managed by the Active Directory server, where the machine ID is an identifier different from all other machine IDs on the domain managed by the Active Directory server, and where the machine ID is not tied to hardware on which the VM is hosted;
   obtain a domain ID from the Active Directory server for said domain managed by the Active Directory server, the domain ID being unique to all other domain IDs of the Active Directory server, where the machine ID and the domain ID are automatically assigned by the Active Directory server responsive to the instance of the OS being run on the VM, wherein the Active Directory server is a remote server communicatively connected with the VM;

send to a remotely coupled license grant application a license request that includes a unique value derived from the machine ID and the domain ID, where the license request is associated with the software;

receive from the remotely coupled license grant application digitally signed license data that includes the unique value derived from the machine ID and the domain ID;

locally store the digitally signed license data; and then in response to executing the software thereafter on the instance of the OS executing on the VM, validate the license, where validating the license includes newly generating a new unique value derived from the machine ID and the domain ID, accessing the locally stored digitally signed license data, and comparing the unique value included in the locally stored digitally signed license data to the new unique value;

continue to execute the software responsive to successfully verifying that the unique value included in the locally stored digitally signed license data that matches the new unique value derived from the machine ID and the domain ID; and responsive to failing to verify that the unique value included in the locally stored digitally signed license data matches the new unique value, providing a message to notify a user that verification of a license certificate of the software failed and terminating execution of the software.

8. The method of claim 1, where a license of a software application only enables the software application to execute on the instance of the operating system executing on the VM belonging to the Active Directory domain.

9. The method of claim 1, where the machine ID and the domain ID are automatically assigned a first time the operating system is run on the VM.

10. The system of claim 4, wherein the new unique value and the original unique value are successfully verified to match when the new unique value and the original unique value are equal.

11. The computer readable storage medium of claim 7, wherein locally storing the digitally signed license data includes storing the digitally signed license data at a local disk drive.

12. The system of claim 4, wherein the digitally signed license data is encrypted.

* * * * *